Jan. 8, 1946.   I. WHITEHOUSE ET AL   2,392,792
ANIMAL PEN
Filed Nov. 28, 1942
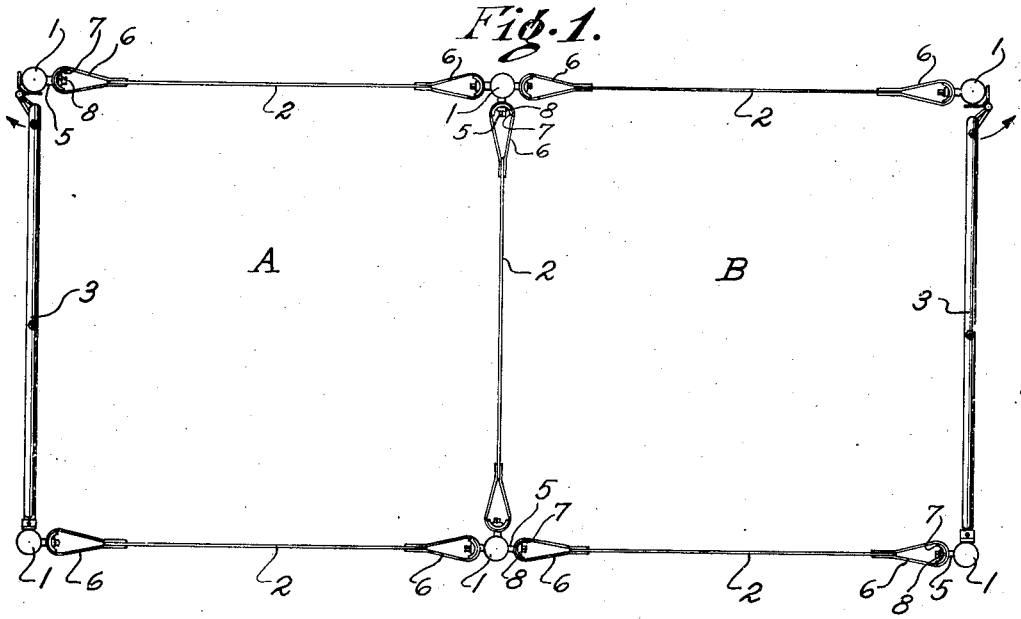
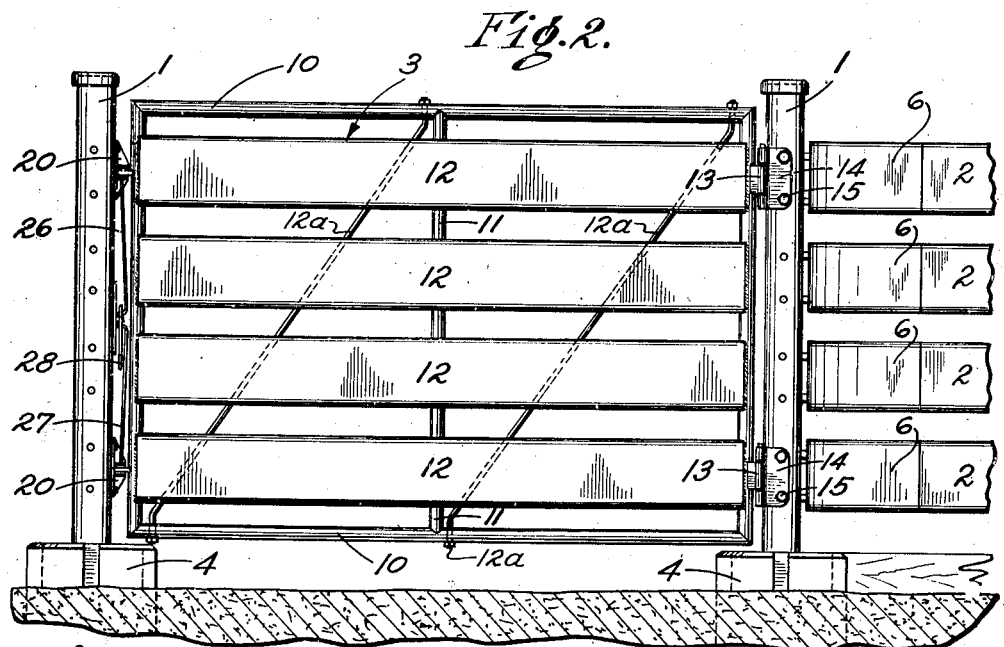
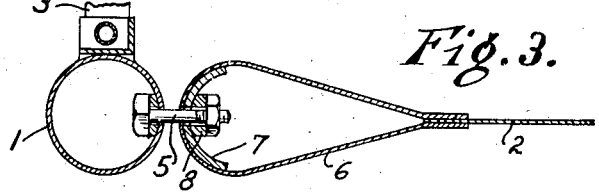
INVENTORS
IRVING WHITEHOUSE,
CECIL SCHOFIELD &
BY EDGAR H. CUMMINGS.
Richey & Watts
ATTORNEYS Patented Jan. 8, 1946

2,392,792

UNITED STATES PATENT OFFICE 2,392,792

ANIMAL PEN

Irving Whitehouse, South Euclid, Cecil Schofield, Lakewood, and Edgar H. Cummings, Cleveland Heights, Ohio, assignors to Republic Steel Corporation, Cleveland, Ohio, a corporation of New Jersey Application November 28, 1942, Serial No. 467,214

4 Claims. (Cl. 256—25)

This invention relates to animal pens and is particularly concerned with new and improved stockyard pens.

Animal pens, for example those used in stockyards, as constructed heretofore consisted of wooden posts with wooden boards or planks nailed on the inner side of the posts so that the animals in the pen could not come into contact with the posts. When one side of a pen was common to an adjacent pen the boards or planks had to be fastened to both sides of the posts for the reason just stated.

The posts and boards or planks of the above described prior pens required considerable space for they had to be sufficiently strong and rigid to resist breakage when the animals were crowded or thrown thereagainst. This rigidity often resulted in injury to the animals. Also, the wooden parts of these pens deteriorated more or less rapidly due to their exposure to the elements and hence the maintenance costs were high.

The present invention avoids the disadvantages of the prior art pens. It reduces the amount of space required by the prior art posts and planks; it requires little or no maintenance over long periods of time; it is fireproof and vermin proof; it is sanitary and easily cleaned; its parts are standardized and interchangeable; it possesses great strength with flexibility and resilience; and it minimizes the amount of bruising or injury of animals confined in the pens.

Briefly stated, one embodiment of the present invention is a pen or enclosure comprising posts connected by horizontal metal strips and defining an enclosure having an opening and a gate for closing that opening. The metal strips are flexible and are so connected to the posts as to be resilient and to prevent animals from coming into contact with the posts.

In the drawing accompanying and forming a part of this specification,

Figure 1 is a plan view of two enclosures embodying the invention;

Figure 2 is a side elevational view of one of the gates and part of the side of one of the enclosures shown in Fig. 1; and Fig. 3 is an enlarged plan view of one of the loop ends 6 of Figs. 1 and 2.

Figure 1 shows two animal pens or enclosures A and B. These enclosures are composed of posts 1, metals panels 2 and a gate 3.

The posts 1 are preferably composed of ferrous metal tubes or pipes suitably anchored in place as by being embedded in concrete foundations 4, or the like. These posts are drilled to receive bolts 5 for securing the panels and gate brackets thereto, as will presently be described.

The panels 2 of Figs. 1 and 3 are composed of flexible ferrous metal strips of any suitable width and length and each strip is provided with a resilient metal loop 6 at each end, the diameters of the loops being preferably about the same as the diameter of the posts 1. These loops 6 may be integral continuations of the panels which are bent back with their free ends secured to the panels or may be composed of strips of steel secured to the ends of panels 2. Spring shoes 7, preferably composed of spring steel, are mounted in each of the loops 6 to maintain the loops in their initial position and to cooperate with the loops in absorbing forces applied against the sides of the panels 2. Bolts 5 pass thru each spring shoe 7 and loop 6 and into the posts 1. Where these bolts extend into a corner post they are provided with heads inside the post but where the panels are in line on opposite sides of a post these bolts may extend from the interior of the loops of one side of the post thru the post and loops on the panel therebeyond. Within each loop 6 each bolt 5 is provided with a washer 8 having a convex surface to seat against the spring shoe 7.

It will be understood from the foregoing description, and by reference to Figs. 1 and 3, that the panels 2 are flexible and will yield under pressure exerted thereagainst by animals and that the panels will be restrained in such movement and returned to their original position by the resilient loops 6 and spring shoes 7, both of which will absorb forces of considerable magnitude which may be applied to the panels. It will also be seen that the loops, by reason of their size, serve to protect the animals from contact with the posts and if and when the animals do contact the posts there is little danger that they will be injured because of proximity of the smooth wide surfaces of the loops to the rounded surfaces of the posts.

Although Fig. 1 shows two enclosures with a common partition, it will be understood that these two enclosures may be made into one enclosure of twice the size of either by removing the panels and their bolts which constitute the partition. Similarly, by removing the gate and the panels constituting the adjacent walls of pen A, only pen B will remain. It will be obvious to those skilled in the art that the number and size of enclosures may be increased or decreased by simply adding the necessary posts, panels and gates.

The gates shown in Fig. 1 are better illustrated in Fig. 2. Each gate shown is composed of a rectangular frame 10, preferably consisting of ferrous metal tubes or pipes disposed at the top, bottom and ends of the frame and welded together at their adjacent ends, and a brace tube or pipe of metal welded at its ends to the upper and lower tubes or pipes of the frame. Thin ferrous metal strips 12 extend horizontally between the vertical end tubes of frame 10 and are welded thereto and to the middle tube 11. Anti-sagging or bracing rods 12a are secured to the top and bottom tubes and extend downwardly at an acute angle to the end tube at the hinged end of the gate.

The gate is hinged to one post by means of arms 13 which are welded to an end tube of the gate and are pivotally connected to brackets 14 which are attached to the post, as by bolts 15 and tapped rails or bars 16.

The post at the other end of the gate has secured thereto upper and lower brackets 20 having flanges provided with vertically aligned holes and horizontal spaces to receive plates carried by the gate and having holes which can be aligned with the holes in flanges 23 when the plates are between those flanges. The said post also carries, between brackets 20, a rod-carrying bracket and upwardly and downwardly extending rods 26 and 27 which are movable in the aligned openings in the brackets and plates by lever 28 which is pivoted to bracket 25.

From the foregoing description it will be understood that the gate may swing freely on the hinges on one post and that it may be locked in closed position when the plates 24 are brought between flanges 23 of the brackets 20 and the lever arm 28 is actuated to force the rods 26 and 27 thru the aligned holes in flanges 23 and plates 24.

While the drawing above described shows round hollow ferrous metal posts, it will be understood that posts of different material and of cross-sectional shapes may be used and that they need not necessarily be hollow. It will also be understood that many departures may be made from the specific illustrated structure of the gate and its parts.

As compared with prior devices, especially those hereinabove described, the apparatus embodying the present invention possesses the following advantages: It requires much less ground area which often is at a premium in cities where stockyards are located; it greatly minimizes the danger of injury to animals confined in the pens; it consists of fewer parts and these parts do not deteriorate so rapidly under exposure to the elements and are not combustible; and it is stronger and much more flexible and resilient. Also the panels are all of the same size so that they are standardized and interchangeable one for another. Similarly, the spring shoes and means for attaching the panels to the posts are standardized and interchangeable. This also applies to the posts.

Having thus described the invention so that others skilled in the art may be able to understand and practice the same, we state that what we desire to secure by Letters Patent is defined in what is claimed.

What is claimed is.

1. An animal pen comprising a plurality of horizontally spaced, vertical posts, panels between each pair of adjacent posts and on opposite sides of certain of the posts, each panel including a plurality of vertically spaced, horizontal, metal strips having resilient, loop-shaped ends whose outer surfaces are disposed adjacent to but out of contact with the opposed sides of the pair of adjacent posts, and means connecting each post with the adjacent loop-shaped ends of said strips.

2. An animal pen comprising a plurality of horizontally spaced, vertical posts, panels between each pair of adjacent posts and on opposite sides of certain of the posts, each panel including a plurality of vertically spaced, horizontal, metal strips having resilient, loop-shaped ends whose outer surfaces are disposed adjacent to but out of contact with the opposed sides of the pair of adjacent posts, and spring shoes within said ends, and means connecting each post with the shoes and the adjacent loop-shaped ends of said strips.

3. An animal pen comprising a plurality of horizontally spaced, vertical posts, panels between each pair of adjacent posts and on opposite sides of certain of the posts, each panel including a plurality of vertically spaced, horizontal, metal strips having rounded edges and resilient, loop-shaped ends whose outer surfaces are disposed adjacent to but out of contact with the opposed sides of the pair of adjacent posts, and means connecting each post with the adjacent loop-shaped ends of said strips.

4. An animal pen comprising a plurality of horizontally spaced, vertical posts, panels between each pair of adjacent posts and on opposite sides of certain of the posts, each panel including a plurality of vertically spaced, horizontal, metal strips having resilient, loop-shaped ends whose diameters are substantially the same as the diameters of the posts and whose outer surfaces are disposed adjacent to but out of contact with the opposed sides of the pair of adjacent posts, and means connecting each post with the adjacent loop-shaped ends of said strips.

IRVING WHITEHOUSE.
CECIL SCHOFIELD.
EDGAR H. CUMMINGS.